United States Patent [19]

Groenendaal et al.

[11] 4,263,270

[45] Apr. 21, 1981

[54] PROCESS FOR WORKING-UP HYDROGEN SULPHIDE-CONTAINING GASES

[75] Inventors: Willem Groenendaal; Colin G. Harvey, both of The Hague, Netherlands

[73] Assignee: Shell Oil Company, Houston, Tex.

[21] Appl. No.: 775,357

[22] Filed: Mar. 7, 1977

[30] Foreign Application Priority Data

Mar. 8, 1976 [GB] United Kingdom ............... 9194/76

[51] Int. Cl.$^3$ ............................................. C01B 17/04
[52] U.S. Cl. ............................... 423/573 R; 423/226; 423/574 R
[58] Field of Search ............... 423/574, 573, 226, 228

[56] References Cited

U.S. PATENT DOCUMENTS

| | | | |
|---|---|---|---|
| 3,436,611 | 8/1969 | Haritatos et al. | 423/574 |
| 3,989,811 | 11/1976 | Hill | 423/573 |
| 4,001,386 | 1/1977 | Klein et al. | 423/574 |
| 4,025,322 | 5/1977 | Fisch | 423/228 X |

OTHER PUBLICATIONS

Meison et al., "Hydrocarbon Processing", Nov. 1974, pp. 171–174.

*Primary Examiner*—G. O. Peters

[57] ABSTRACT

Process for the work-up of hydrogen-sulfide containing gases which are normally subjected to Claus process, reduction, absorption, and desorption, characterized in that a portion of the feed gases by-passes the Claus unit and is processed in a $CO_2$-selective secondary absorption-desorption procedure.

3 Claims, 1 Drawing Figure

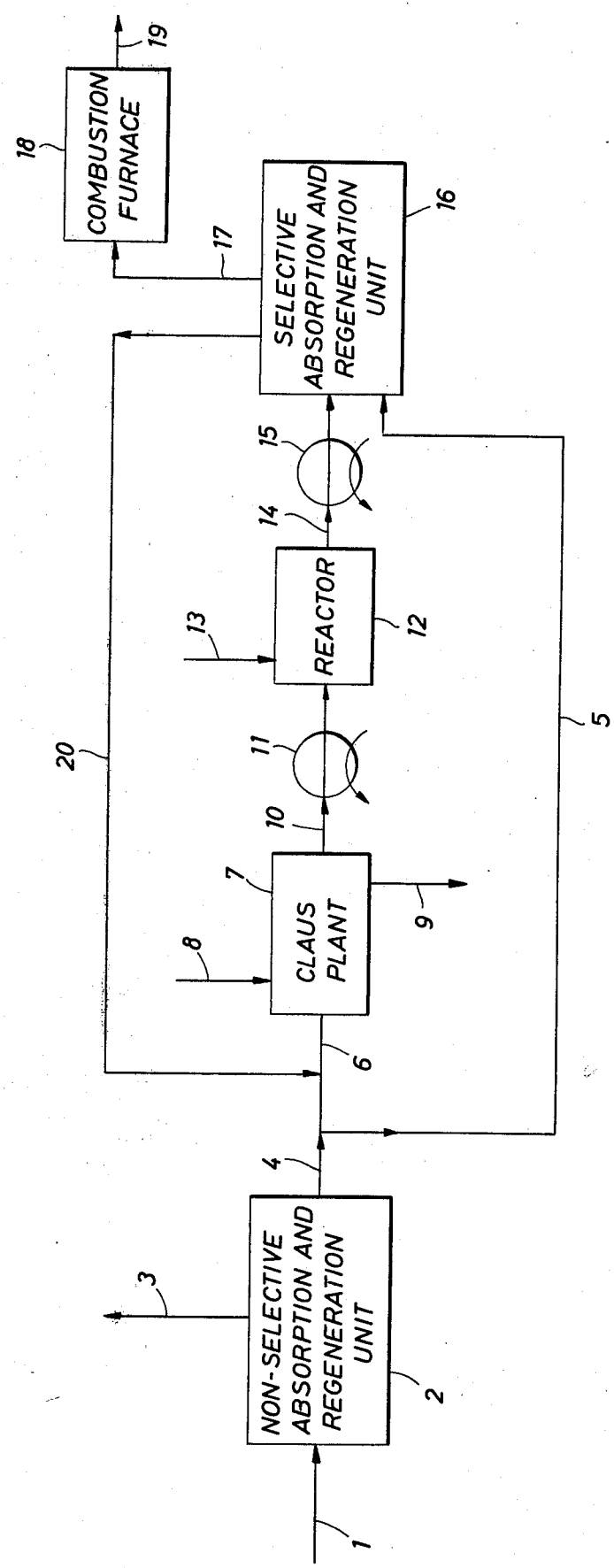

PROCESS FOR WORKING-UP HYDROGEN SULPHIDE-CONTAINING GASES

The invention relates to an improved process for working-up hydrogen sulphide-containing gases.

A process for reducing the total sulphur content of off-gases from Claus plants has already been proposed. In such a process the said off-gases are passed at a temperature above 175° C., together with a free hydrogen- and/or free carbon monoxide-containing gas over a sulphided Group VI and/or Group VIII metal catalyst supported on an inorganic oxidic carrier, after which the off-gases thus treated are passed through a liquid and regenerable absorbent for hydrogen sulphide and the unabsorbed portion of the said off-gases, optionally after incineration, is discharged into the atmosphere, the hydrogen-sulphide enriched absorbent being regenerated and used again for further absorption of hydrogen sulphide, and the hydrogen sulphide rich gas mixture liberated in the regeneration being passed to a Claus plant. It is preferred to recycle the hydrogen sulphide-rich gas mixture liberated in the regeneration to the Claus plant where the off-gases come from, so as to obtain a closed process.

In general, feedstocks for Claus plants are hydrogen sulphide-containing gases produced in the regeneration step of gas purification processes. These gas purification processes, which are required in order to reduce the sulphur constituents (in most cases mainly hydrogen sulphide) of industrial gases, such as refinery gas, natural gas or synthesis gas produced by the partial combustion of hydrocarbons or coal, to acceptably low levels prior to their further use, usually involve absorbing the sulphur components of the gases in a liquid absorbent which is subsequently regenerated to give hydrogen sulphide-rich gases. These latter gases are then converted according to the Claus reaction, elemental sulphur being produced and removed, and the reaction off-gases are thereafter advantageously treated in the manner described above in order to reduce the sulphur content of the gases which are discharged to the atmosphere, to a very low level.

Apart from sulphur constituents, the above-mentioned industrial gases often contain amounts of carbon dioxide which are also required to be removed before these gases are industrially used. Accordingly, a liquid absorbent is used which removes both sulphur constituents and carbon dioxide. Upon regeneration of the fat liquid absorbent hydrogen sulphide/carbon dioxide-containing gases are obtained which are then processed in a Claus plant. As long as these gases have a low carbon dioxide content (up to about 15% by volume), they can satisfactorily be worked-up in a Claus plant followed by a treating plant for treating the Claus off-gas in accordance with the above-mentioned process. However, if the gas fed to the Claus plant contains higher amounts of carbon dioxide the Claus plant requires to be specially designed resulting in a larger and less efficient plant. The treating plant incorporating the reduction and absorption steps as hereinbefore described is also larger and less efficient.

The present invention provides a process in which hydrogen sulphide-containing gases having high amounts of carbon dioxide are converted according to the Claus reaction to produce elemental sulphur and wherein the reaction off-gases are subsequently treated in the manner as described above without having the drawbacks already described.

The invention therefore relates to an improved process for working-up hydrogen sulphide-containing gases in which the sulphur constituents of the said gases are converted to elemental sulphur in a Claus plant, the sulphur thus formed then being removed from the process and the reaction off-gases are passed together with a free hydrogen- and/or free carbon monoxide-containing gas at a temperature above 175° C. over a sulphided Group VI and/or Group VIII metal catalyst supported on an inorganic oxidic carrier, whereafter the reduced off-gases thus obtained are passed through a liquid and regenerable absorbent for hydrogen sulphide and the unabsorbed portion of the said reduced off-gases is discharged into the atmosphere, the hydrogen sulphide-enriched absorbent being regenerated and used again for further absorption of hydrogen sulphide and the hydrogen sulphide-rich gas mixture liberated in the regeneration is passed to a Claus plant, in which process, at least part of hydrogen sulphide-containing gases comprising above 20% by volume or more of carbon dioxide, by-passes the Claus plant and is contacted directly with the liquid and regenerable absorbent for hydrogen sulphide.

By "Claus reaction" is meant the reaction between hydrogen sulphide and sulphur dioxide in which elemental sulphur and water are produced. By "Claus plant" is meant a plant for carrying out the Claus reaction incorporating a thermal zone in which hydrogen sulphide is partially combusted to produce sulphur dioxide in the correct proportion which then reacts with the unburned hydrogen sulphide to give sulphur and water, the sulphur then being condensed and removed, followed by one or more catalytic zones in which the same reaction is further promoted and additional sulphur removed.

By "Claus off-gases" will be understood the remaining gases as are obtained after the last catalytic zone of a Claus plant. It is customary to apply Claus processes in which use is made of two zones but a third catalytic zone is regularly used as well. In addition to hydrogen sulphide and sulphur dioxide in a ratio of approximately 2:1, off-gases of this type also contain sulphur, oxygen, nitrogen and small amounts of inert gases if the Claus plant is operated with air, water as water vapour, carbon dioxide and small amounts of carbon monoxide, carbonyl sulphide and carbon disulphide.

The process according to the invention is particularly suitably applied to hydrogen sulphide-containing gases containing 40–85% by volume of carbon dioxide. Gases containing even higher amounts of carbon dioxide can also be used however.

In a special embodiment of the invention the hydrogen sulphide/carbon dioxide-containing gases are obtained from an absorption process which is non-selective or partly selective with regard to the absorption of carbon dioxide and the part of the gases which by-passes the Claus plant is subjected, together with the reduced Claus off-gas, to an absorption process which is selective with regard to the absorption of carbon dioxide. The advantages of this embodiment are that both sulphur constituents and carbon dioxide are removed in the non-selective gas purification process to give a clean product gas and that of the carbon dioxide contained in the hydrogen sulphide-containing gases which pass directly to the selective absorption process very little is returned via the gas recycle to the Claus plant. The absorbent used in the non-selective gas purification process can be any absorbent which readily absorbs both sulphur compounds and carbon dioxide. Examples of such absorbents are sulfinol and monoethanolamine.

The absorbent used in the selective absorption process is preferably an aqueous solution of an amine or a substituted amine. Absorbents of this type are well-known in the art and include, inter alia, alkali metal salts of dialkyl-substituted amino acids, such as potassium dimethyl amino acetate and alkanolamines. A polyalkanolamine such as di- or tri-ethanolamine or di-(iso)-propanolamine is very suitably used. Particularly preferred, however, is an alkanolamine with a tertiary-substituted nitrogen atom and of such compounds methyl diethanolamine gives an exceptionally high selective separation of hydrogen sulphide and carbon dioxide and is therefore most advantageously used in the present process. The more selective the absorbent is with respect to the absorption of carbon dioxide, the less is the amount of carbon dioxide which is recycled to the Claus plant and accordingly the extent to which carbon dioxide builds up in the system is minimized. As a result the amount of the hydrogen sulphide-containing gases which require to by-pass the Claus plant, is reduced.

In a further preferred embodiment of the invention the reduced off-gases and the by-passed hydrogen sulphide/carbon dioxide-containing gases are contacted with the absorbent in an absorption column containing less than 20 trays and wherein absorbent and gas flow are countercurrent, the said hydrogen sulphide/carbon dioxide-containing gases being introduced into the column at a point further removed from the absorbent inlet than the point at which the reduced off-gases are introduced into the column. In this way the stream containing the highest percentage amount of hydrogen sulphide (viz. the by-pass stream) comes into contact with the absorbent after the absorbent has contacted and cleaned the reduced Claus off-gases having a lower percentage of hydrogen sulphide. The efficiency of the absorption operation is hereby enhanced.

The percentage of the hydrogen sulphide-containing gases which by-pass the Claus plant to the gases which pass to it varies widely and depends mainly on the carbon dioxide content of the gases although the design of the Claus plant itself also plays a role. In principle, the by-pass could range from 5–95% of the total flow to the Claus plant. However, more usually when hydrogen sulphide-containing gases having a carbon dioxide content of between 40 and 85% are processed, the by-pass range lies between 40 and 70% of the total flow.

The process according to the invention is suitably used for all hydrogen sulphide-containing gases having high carbon dioxide contents. Hence, for example, hydrogen sulphide-containing gases recovered from processes in which natural or synthesis gases containing high amounts of carbon dioxide are cleaned, are very suitably used. The present process is particularly advantageously applied to hydrogen sulphide-containing gases obtained from an absorption process used for the purification of gases emanating from a partial combustion process.

After having passed the last bed and the relevant condenser for the recovery of elemental sulphur, Claus off-gases normally have a temperature of from 130° C. to 170° C. For the reduction stage over the Group VI and/or Group VIII metal catalyst, however, the off-gases should have a higher temperature, and therefore these off-gases are first heated to a temperature in excess of 175° C. The Claus off-gases are preferably raised to a temperature in the range of from 180° C. to 350° C., and more preferably between 200° C. and 300° C.

The increase in temperature to above 175° C. is also important in view of the presence of small amounts of elemental sulphur in the form of a mist in the off-gases. This objectionable sulphur mist disappears by raising the temperature above the dew point of sulphur. It has also been found that as a result of raising the temperature to above 175° C., and preferably above 180° C., the presence of elemental sulphur in the gas phase has no adverse effect on the catalytic activity of the reduction catalyst to be used.

After heating to a temperature in excess of 175° C., the Claus off-gases, together with hydrogen or a hydrogen-containing gas, are passed over a sulphided Group VI and/or Group VIII metal catalyst in order to reduce sulphur dioxide to hydrogen sulphide. At the same time, elemental sulphur and sulphur compounds other than hydrogen sulphide are converted to hydrogen sulphide. The reduction catalysts used may be catalysts containing molybdenum, tungsten and/or chromium as Group VI metal, and preferably a metal from the iron group, such as cobalt, nickel and/or iron as Group VIII metal. The inorganic oxidic carrier may be alumina, silica, magnesia, boria, thoria, zirconia or a mixture of two or more of these compounds. Suitable reduction catalysts for use in accordance with the process of the invention are a $Ni/Mo/Al_2O_3$ or a $Co/Mo/Al_2O_3$ catalyst.

The treatment of the off-gases with a hydrogen- and/or carbon-monoxide-containing gas is preferably effected at a temperature in the range of from 180° C. to 350° C., and more preferably between 200° and 300° C. Although the pressure applied is mainly atmospheric, slightly elevated pressures may also be used, if desired. The gas hourly space velocity applied during the reduction is 500 to 10,000 Nl of Claus off-gases per liter of catalyst per hour.

The hydrogen- and/or carbon-monoxide-containing gas used may advantageously be a gas containing both compounds, such as town gas, water gas, and synthesis gas. Pure hydrogen or carbon monoxide may also be used as well. Suitable hydrogen-rich gases or gas mixtures are the off-gas of a catalytic reforming unit, the gas produced in a hydrogen plant or the gas obtained from a processing unit for saturated crude gases from petroleum.

The hydrogen-containing gas preferably contains at least 20% by volume of $H_2$ or an equivalent amount of hydrogen and carbon monoxide. The hydrogen or the hydrogen-containing gas is used in such an amount that the ratio between hydrogen and sulphur dioxide is of from 3:1 to 15:1. This ratio is preferably of from 3.5:1 to 8:1.

The above ranges remain the same when reducing gas mixtures are used containing both hydrogen and carbon monoxide and when only carbon monoxide is used, since the carbon monoxide is equivalent to hydrogen. If elemental sulphur is also present in the Claus off-gases, the quantity of hydrogen and/or carbon monoxide required can also be calculated on elemental sulphur as a percentage of $SO_2$.

After absorption, the hydrogen-sulphide enriched absorbent is regenerated by heating and/or stripping, which produces a hydrogen-sulphide enriched gas mixture and a regenerated absorbent which may be re-used. However, since regeneration is never complete and carbon dioxide may built up in the absorbent after prolonged use, especially if the Claus off-gases have a high $CO_2$-content, these gases, after treatment with hydrogen- and/or carbon-monoxide-containing gas as described above, are preferably contacted in order to increase the selectivity of the hydrogen sulphide absorbent and therefore to decrease the circulation rate of the solvent, with the aqueous solution of an amine or substituted amine at a low temperature while using high gas velocities, the said contacting taking place in an absorption column having less than 20 contacting trays. More preferably, the absorption column has 4 to 15 contacting trays. The gas velocity to be used is at least 1.0 m/sec., and more preferably 2 to 4 m/sec. These gas velocities are based on the "active" or aerated tray surface.

A low absorbent temperature enhances the selectivity of the hydrogen-sulphide/carbon-dioxide separation. The temperature is preferably lower than 40° C.; most satisfactory results are obtained at temperatures in the range of from 5° C. to 30° C. The Claus off-gases are contacted with the aqueous solution of an amine or substituted amine at atmospheric or substantially atmospheric pressure.

When the absorbent has been passed through, the unabsorbed part of the off-gases which now consists mainly of nitrogen and carbon dioxide in addition to very small amounts of hydrogen and traces of hydrogen sulphide, is discharged into the atmosphere. If desired, this unabsorbed portion may also be incinerated in the usual manner before passing it to the stack.

The hydrogen sulphide gas which is freed in the regeneration of the hydrogen sulphide-enriched absorbent and which also contains some carbon dioxide and water is first cooled in order to condense the water present therein. Normally, at least part of this water is recycled to the regeneration step in order to maintain the water content of the aqueous absorbent at the required level. After cooling, the hydrogen-sulphide rich gas is passed to a Claus plant to recover elemental sulphur from the gas. Since the process according to the invention is applied to Claus off-gases, the hydrogen sulphide gas obtained in the regeneration is most suitably recycled to the same Claus plant.

The invention will now be elucidated with reference to the sole FIGURE which depicts a simplified process flow scheme in which auxiliary items of equipment, such as pumps, valves, coolers, etc., have been omitted.

In the FIG. 1 designates a line through which hydrogen sulphide/carbon dioxide-containing gases emanating from a partial combustion process are passed to a non-selective absorption/regeneration unit 2. A substantially hydrogen sulphide and carbon dioxide-free product gas leaves the unit via a line 3 and hydrogen sulphide/carbon dioxide-rich gas leave via a line 4. Part of the latter gases by-passes a Claus plant 7 via a line 5 and the rest passes to the said Claus plant via a line 6. Claus plant 7 incorporates a thermal stage and aftercooler/sulphur condenser and a number of catalytic stages with interstage coolers/sulphur condensers (not shown on the FIGURE). The gases are converted in the Claus plant, an oxygen-containing gas being fed via a line 8 and elemental sulphur being removed via a line 9. The Claus plant off-gases flow via a line 10 and a heat exchanger 11—instead of a heat exchanger a line burner may also be used—to a reactor 12 in which the gases are reduced with a hydrogen-containing gas supplied via a line 13 in the presence of a reduction catalyst. The reduced off-gases leave reactor 12 via a line 14 and are cooled in a heat exchanger 15 after which they pass together with the bypass stream 5 to a selective absorption/regeneration unit 16. The unabsorbed components of the off-gases consisting mainly of carbon dioxide and nitrogen are discharged from unit 16 through a line 17. In order to convert all traces of hydrogen sulphide the gases are incinerated in a combustion furnace 18 before being discharged to the atmosphere via a line 19. The hydrogen sulphide-rich gases obtained from the regeneration step of the absorption/regeneration unit 16 are recycled to the Claus plant via a line 20.

It is observed that in the FIGURE shown the feedstream to the Claus plant is split before its introduction in the said plant. In practical operation such as at a refinery, it may well be possible that two or more non-selective absorption regeneration units 2 are operated in parallel which parallel units need not necessarily treat the same type of gases. In such a case that stream of hydrogen sulphide-containing gas which has the highest carbon dioxide content, may be fed in total to the selective absorption/regeneration unit 16, while the second hydrogen sulphide-containing stream which has the lower carbon dioxide content may be fed in total to the Claus plant 7.

In principle it is possible to dispose in the above-described manner of any hydrogen sulphide-containing gas of which direct introduction into the Claus plant is, for one or another reason, undesirable by passing it to the unit 16.

The practical application of the present invention will now be demonstrated with reference to the following Examples.

EXAMPLE I 200 kmols/h of a hydrogen sulphide/carbon dioxide-containing gas stream obtained from the regeneration of a sulfinol absorbent used for the purification of synthesis gas emanating from a partial combustion process, was treated in a process substantially as depicted in the FIGURE. The hydrogen sulphide/carbon dioxide-containing gas had the following composition:

$H_2S$, 22 vol.%
$CO_2$, 72 vol.%
$H_2O$, 5 vol.%
hydrocarbons, 1 vol.%

Fifty percent of the gas stream passed directly to the Claus plant and fifty percent by-passed the plant and passed directly to the selective absorption/regeneration unit following the reduction reactor operating on the Claus plant off-gases. This absorption/regeneration unit, employing an aqueous solution of methyl diethanolamine the concentration of which was approximately 2-molar with respect to the amine, gave rise on regeneration to an acid gas which was recycled to the Claus plant. This acid gas amounted to 47 kmols/h and had the following composition:

$H_2S$, 52 vol.%
$CO_2$, 44 vol.%
$H_2O$, 4 vol.%

The amount of the combined feed stream and recycle stream which entered the Claus plant was 147 kmol/h and its composition was:

$H_2S$, 32 vol.%
$CO_2$, 63 vol.%
$H_2O$, 43 vol.%
hydrocarbons 0.7 vol.%

This combined stream was combusted in the Claus plant to produce elemental sulphur which was removed from the process and the Claus off-gases were then heated and passed to a reactor in which they were reduced at a temperature of 230° C. in the presence of hydrogen over a sulphided Co/Mo/Al$_2$O$_3$ catalyst. The gases leaving the reactor were cooled to 55° C. and passed to the selective absorption/regeneration unit of which the absorption column had less than 20 contacting trays. The by-passed feed stream entered this same absorption column a point further removed from the point of the absorbent inlet.

The treated gas was then charged to an incinerator and burnt to give a gas having less than 500 ppm sulphur. The overall efficiency of the process expressed in terms of the percentage of sulphur compounds removed was 99.6%.

It should be noted that as a result of the proposed by-pass the Claus plant had only to treat 147 kmols/h of gas instead of 200 kmols/h if no by-pass were used. The Claus plant can therefore be built smaller. It can further be seen that the feedstream to be treaded has a higher H$_2$S-content than without a by-pass, which is of an advantage in operating the thermal stage of the Claus plant.

EXAMPLE II

The plant processing a feedstream as mentioned in Example I was modified in order to process a low pressure off-gas of a chemical plant as well. This additional off-gas was obtained in an amount of 20 kmols/h and had the following composition:

H$_2$S, 10 vol.%
CO$_2$, 85 vol.%
H$_2$O, 5 vol.%

The additional off-gas was directly passed to the selective absorption/regeneration unit following the reduction reactor operating on the Claus plant off-gases. The said off-gas entered into the absorption column of this unit at a point in between the inlet of the absorbent and of the by-passed feed stream.

With all the conditions remaining the same as in Example I the amount of acid gas obtained on regeneration and recycled to the Claus gas was 52 kmols/h. It had the following composition:

H$_2$S, 52 vol.%
CO$_2$, 44 vol.%
H$_2$O, 4 vol.%

The amount of the combined feed stream and recycle stream which entered the Claus plant was 152 kmols/h and its composition was:

H$_2$S, 32.1 vol.%
CO$_2$, 62.6 vol.%
H$_2$O, 4.6 vol.%
hydrocarbons 0.7 vol.%

The overall efficiency of the process as 99.6% on sulphur compounds removed.

We claim:

1. In a process for the work-up of a hydrogen sulphide-containing gas feedstock for a Claus unit, said gas feedstock containing high amounts of carbon dioxide, in which process the sulphur-containing constituents of the gas are converted to elemental sulphur in a Claus plant, the sulphur formed being removed from the process, the reaction off-gases are passed together with a free hydrogen-and/or free carbon monoxide-containing gas at a temperature above 175° C. over a sulphided Group VI and/or Group VIII metal catalyst supported on an inorganic oxidic carrier, and whereafter the reduced off-gases thus obtained are passed through a liquid and regenerable absorbent for hydrogen sulphide and the unabsorbed portion of the said reduced off-gases is discharged into the atmosphere, the hydrogen sulphide-enriched absorbent being regenerated and used again for further absorption of hydrogen sulphide and the hydrogen sulphide-rich gas mixture liberated in the regeneration is passed to a Claus plant, the improvement wherein from 40 to 70 percent of the hydrogen sulphide-containing gas feedstock, comprising above 20% by volume of carbon dioxide, by-passes the Claus plant and is contacted directly with the liquid and regenerable absorbent for hydrogen sulphide, said absorbent also being CO$_2$ selective.

2. The process of claim 1 in which the liquid and regenerable absorbent is an alkanolamine with a tertiary-substituted nitrogen atom.

3. The process of claim 2 in which the reduced off-gases and the by-passed hydrogen sulphide/carbon dioxide-containing gas feedstock are contacted with an absorbent in an absorption column containing less than 20 trays and wherein absorbent and gas flow are countercurrent, the hydrogen sulphide/carbon dioxide-containing gas being introduced into the column at a point further removed from the absorbent inlet than the point at which the reduced off-gases are introduced into the column.

* * * * *